United States Patent
Voss

(10) Patent No.: US 7,645,088 B2
(45) Date of Patent: Jan. 12, 2010

(54) ARTICULATED ARM FOR AN AWNING AND METHOD FOR THE PRODUCTION THEREOF

(75) Inventor: Wolfgang Voss, Hermann-Forck-Strasse (DE)

(73) Assignee: Paul Voss GmbH & Co. KG, Finnentrop-Heggen (DE)

( * ) Notice: Subject to any disclaimer, the term of this patent is extended or adjusted under 35 U.S.C. 154(b) by 0 days.

(21) Appl. No.: 11/676,289

(22) Filed: Feb. 17, 2007

(65) Prior Publication Data

US 2008/0035276 A1    Feb. 14, 2008

Related U.S. Application Data

(63) Continuation of application No. PCT/EP2005/008793, filed on Aug. 12, 2005.

(30) Foreign Application Priority Data

Aug. 24, 2004    (DE) ....................... 10 2004 041 516

(51) Int. Cl.
*F16B 17/00*    (2006.01)

(52) U.S. Cl. ..................... 403/345; 403/361; 160/78

(58) Field of Classification Search ............ 248/220.21, 248/220.22, 221.11, 222.11, 224.7, 223.41, 248/224.51, 225.11, 273; 403/361, 358, 403/345, 373, 374.4, 109.1, 109.2, 109.3, 403/109.4, 109.5, 109.6, 109.7, 109.8, 315, 403/316, 317, 318, 319; 160/22, 66, 67, 160/69, 70, 71, 78, 79, 80; 135/88.11, 88.12, 135/121, 122, 146

See application file for complete search history.

(56) References Cited

U.S. PATENT DOCUMENTS

| | | | | |
|---|---|---|---|---|
| 3,645,569 A * | 2/1972 | Reilly | ........................... | 403/4 |
| 3,695,649 A * | 10/1972 | Laverone | .................... | 403/231 |
| 4,867,699 A * | 9/1989 | Oda et al. | ................... | 439/355 |
| 5,185,992 A * | 2/1993 | Garcia | ..................... | 56/400.04 |
| 5,203,135 A * | 4/1993 | Bastian | ..................... | 52/726.1 |
| 5,971,790 A * | 10/1999 | Rohde | ........................ | 439/357 |
| 6,585,220 B1 * | 7/2003 | Shemuga | ................... | 248/535 |

FOREIGN PATENT DOCUMENTS

EP    1 063 367    12/2000

\* cited by examiner

*Primary Examiner*—A. Joseph Wujciak, III
(74) *Attorney, Agent, or Firm*—Kevin J. McNeely; McNeely & Hare LLP

(57) ABSTRACT

An articulated arm for an awning has an articulation part and an arm profile which are inserted one into the other. Furthermore, pull-off protection is present. The articulation part and the arm profile are inserted one into the other with a press fit, and the pull-off protection is designed as a claw present between the articulation part and arm profile.

15 Claims, 4 Drawing Sheets

ARTICULATED ARM FOR AN AWNING AND METHOD FOR THE PRODUCTION THEREOF

CROSS REFERENCE OF PENDING APPLICATION

This application is a continuation of pending international application PCT/EP2005/008793 filed on Aug. 12, 2005 which designates US and which claims priority of German patent application 10 2004 041 516.1 filed on Aug. 24, 2004.

BACKGROUND OF THE INVENTION

The invention relates to an articulated arm for an awning, with an articulation part and with an arm profile which are inserted one into the other and which are provided with pull-off protection.

The invention relates, furthermore, to a method for the production of an articulated arm of an awning, in which an articulation part and an arm profile are inserted one into the other and are protected against being pulled off from one another.

Articulated arms are in widespread use in shading installations and serve, for example, for guiding an awning cloth when the latter is moved in or out. Such an articulated arm consists of an arm profile, usually a hollow profile, to the ends of which articulation parts are attached. The articulation parts usually have a tenon which is driven into the interior of the hollow profile. The awning arm is mounted in an articulated manner, that is to say moveably, by means of the articulation part.

Depending on the configuration of the awning, this is a single awning arm pivotable out of an upright position into a tilting position, for example in the case of sun-blinds, or a collapsible arm composed of two articulated arms, in the case of collapsible-arm awnings which move out and in essentially horizontally or at a downward inclination. Awnings are structures which have a very long useful life, a lifetime of ten, fifteen and twenty years being customary.

Furthermore, during this period of time, awnings are exposed to rough environmental conditions, since they are normally mounted on the outsides of buildings. When the awnings are moved out and in, particularly where collapsible-arm awnings are concerned, considerable forces act on the connection between the articulation part and arm profile, considerable tensile or compressive forces acting alternately on the components pushed one into the other when the awnings are moved out and in.

Care must therefore be taken to ensure that there is pull-off protection which permanently prevents the arm profile from being pulled off from the articulation part.

It became known to implement the pull-off protection by means of a screw connection or a clinch bolt which extend transversely with respect to the insertion direction through the arm profile and the tenon, pushed into the latter, of the articulation part.

This pull-off protection has the disadvantage that it is visible from outside and forms a point where unsightly dirt accumulations or possibly corrosions may occur, so that even moisture and dirt can penetrate into the interior of the arm profile. Inside the arm profile are received tension devices, such as springs, ropes, chains of the like. Conventionally, the arm profile and articulation part are produced from aluminum or aluminum alloys which are corrosion-resistant. However, the screws or bolts are produced from ferrous materials and tend, particularly in long-term use, to corrosion.

The adhesive bonding technique was therefore adopted for connection purposes. In this case, the dimension of the tenon, to be pushed into the arm profile, of the articulation part was selected such that it has a sufficient undersize to introduce all adhesive between the outside of the tenon and the inside of the arm profile.

Particularly in the case of collapsible-arm awnings, which often have a width of several meters and also drop lengths of several meters, the outer drop rod should be in exactly parallel alignment with the housing carrying the winding shaft, both in the extended and in the retracted state. Angular deviations out of this parallel alignment of only one or two degrees lead, in the case of extremely wide awnings, to an unsightly skewing in alignment between the drop rod, whether it is retracted or extended, and the housing.

All the abovementioned manufacturing methods have some relatively high inaccuracy factors due to tolerances and angular errors, and it is highly complicated to implement the connection during manufacture.

In adhesive bonding, the arms have to be held and oriented, for example, in a special holding machine, and it is necessary to wait until the adhesive compound has cured completely.

In connection by means of rivets or screws, after the arm profile has been attached or pushed onto the articulation part corresponding bores have to be made and the screws or rivets inserted into these.

This is highly time-consuming and is a considerable impediment to the manufacturing flow.

Awning manufacturers endeavor to dispatch the individual parts, particularly in the case of international sales networks, to the distributors who then have to carry out the final manufacture of the articulated arms at a correspondingly high outlay.

It is an object of the invention to remedy this and to provide an articulated arm and a method for the production thereof, which is simple to carry out and ensures a permanently reliable, in particular pull-off protected connection between the arm profile and articulation part.

SUMMARY OF THE INVENTION

This takes place, according to the invention, in that the articulation part and arm profile are inserted one into the other with a press fit, and in that the pull-off protection is designed as at least one claw present between the articulation part and arm profile.

In terms of the method, the articulation part and arm profile are inserted one into the other with a press fit and are protected against being pulled off from one another by the provision of at least one claw between the articulation part and arm profile.

The term "press fit" in the context of the present application means the technical measure of coordinating the size of articulation part and the arm profile with one another such that these are inserted one into the other with an interference fit. This press fit is not determined by random manufacturing tolerances, which could be the case in the prior art initially mentioned due to such tolerances, but, instead, a defined oversize fit is implemented, which leads, independently of tolerances, to an interference fit. If, for example, the arm part is designed as a hollow profile, the outer dimension of the tenon of the articulation part which is driven into the interior is produced with a defined oversize, at least at specific points, so that the interference fit necessarily takes place and is not dependent on random manufacturing tolerances.

The term "claw" in the context of the present invention is to be understood as meaning a technical measure which allows the arm profile and articulation part to be joined together, but prevents these two parts from being pulled off from one another by means of a positive connection.

Since this claw is present between the articulation part and arm profile, said claw is not visible from outside and therefore also does not afford the disadvantages afforded by a screw or rivet connection to be implemented from outside.

The combination of the measures of the press fit and of the claw provides a sufficiently firm fit between the components pushed one into the other, this fit being implemented essentially by the press fit. The claw has the task of implementing additional mechanical pull-off protection.

The "inner" positive connection by means of the claw ensures that protection against pulling off is implemented, even during long-term operation, under the alternating mechanical loads which are also accompanied in parallel by thermal and environmental loads. Tests showed that this pull-off protection is so firm that nondestructive release is virtually no longer possible.

Mounting is to be implemented without special equipment, in particular orienting equipment, or complicated measures, such as bores or the like.

The claw may in this case be designed as a separate component, as a component of the articulation part and/or as a component of the arm profile and, when the articulation part is driven into the arm profile or, correspondingly conversely, when the arm profile is pushed onto the articulation part, is introduced forcibly between these and "bites" or "claws" in between these in such a way that pushing one into the other is still possible, but pulling off is blocked.

Thus, not only can a visually pleasing connection, without a pull-off protection visible from outside, be implemented, but there is also, at the connection point, no fault-prone orifice with a connection to the outside between the interior and the outside of the arm profile, and therefore no corrosion can take place here.

Depending on the configuration of the awning, the final manufacturer can correspondingly cut to length the arm profile, which is normally designed as a continuous profile, and can then make the connection between the articulation part and arm profile by joining together by means of an appropriate tool, this being simple to carry out.

In a further embodiment of the invention, on the articulation part and on the arm profile engagement surfaces are present which come to lie one against the other with a press fit in a defined manner during insertion one into the other.

The advantage of this measure is that the nature and extent of the press fit are clearly defined by these engagement surfaces and lead to a calculable precomputable press fit of specific strength.

In a further embodiment of the invention, at least one engagement surface lies against an element which is deformable during insertion one into the other.

The materials normally used in awning construction, that is to say aluminum or aluminum alloys, are materials which are readily accessible to defined cold forming. The extent and strength of the press fit can thus be controlled by the provision of correspondingly deformable elements.

In a further embodiment of the invention, the arm profile is designed as a hollow profile, from the inside of which deformable elements project.

The advantage of this measure is that these deformable elements can be produced in the desired dimension, shape and strength by continuous casting in the case of hollow profiles and, irrespective of the length by which such an arm profile piece has to be cut off, can be available over the entire length of the latter.

This considerably facilitates the outlay in structural terms for this technical measure of defined deformability.

In a further embodiment of the invention, these deformable elements are designed as longitudinal webs.

The advantage of this measure is that such longitudinal webs can be formed particularly simply, during the original production of the arm profiles, as continuous casting profiles.

In a further embodiment of the invention, at least one flank of a longitudinal web is designed as an engagement surface.

The advantage of this measure is that such a longitudinal web can come, with a highly specific flank, provided and designed for this purpose, into connection with the articulation part, and therefore this engagement can be controlled and reliably carried out.

In a further embodiment of the invention, the articulation part has a tenon which can be inserted into the arm profile and which has an engagement surface with the arm profile.

This measure, in turn, has the advantage in manufacturing terms that the corresponding engagement surface can be implemented even during the production of the articulation part and then cooperates with the arm profile.

In this case, the abovementioned deformable elements may be present both on the arm profile and on the articulation part, but they may also be present on only one of the two parts.

In a further embodiment of the invention, in the tenon grooves and/or clearances are present, the flanks of which come into engagement as an engagement surface with deformable elements on the arm profile.

This measure has the advantage, particularly in manufacturing terms, that the engagement surfaces and the elements deformable, where appropriate, by these can be implemented even during the original production of the parts. As mentioned above, this may be implemented by the provision of webs on the inside of the hollow profile of the arm part and, in the case of the articulation part, by the provision of corresponding grooves or clearances. The articulation parts are also normally produced as castings, so that these engagement surfaces can be implemented even during original production, without further machining operations, such as milling operations or the like, being necessary.

In a further embodiment of the invention, in the tenon engagement surfaces are present which run in the insertion direction and which have an inclination with respect to the insertion direction.

This measure has the advantage that, when the articulation part and arm profile are pushed one into the other, initially no great effort is necessary, that is to say these can be applied to one another and slipped in over a certain distance. Only when the two parts continue to be inserted one into the other do the engagement surfaces come into engagement, and the press fit is implemented.

In a further embodiment of the invention, two grooves which converge in the insertion direction are indented in the tenon in the insertion direction.

This measure has the abovementioned advantage that, for example, corresponding webs of the arm profile can be pushed into these two grooves and serve initially as a guide, so that there is exact alignment between the articulation part and arm profile, and then, due to convergence, the engagement surfaces come increasingly into engagement in a defined manner.

This makes it possible, for example, first to insert the articulation part into the arm profile by hand and then to drive it further in by means of a tool, for example by means of a hammer or a propulsion cylinder.

In one embodiment of the invention, the claw is designed as a separate component.

The advantage of this measure is that, in terms of the selection of materials and of the design, the claw is independent of the design and selection of the materials of the arm profile and articulation part.

Thus, for example, the claw may be produced from those materials which can bite into the relatively soft aluminum-containing materials and can then absorb the correspondingly high forces in order to counteract pulling off.

In a further embodiment of the invention, the claw can be attached to the articulation part.

The advantage of this measure is that currently available conventional hollow profiles can be used as arm profiles and no additional measures for implementing the clawing have to be provided on these. Handling is also simplified, to be precise the claw is attached to the articulation part and subsequently this assembly is driven through the hollow profile.

In a further embodiment of the invention, the claw can be attached with a firm fit in a recess on the articulation part.

The advantage of this measure is that an appropriate claw can be selected on the spot, for example taking into account the corresponding design conditions, in particular the drop length and the width of the awning, and can be inserted into the recess, and this assembly consisting of the articulation part and of the claw can then be driven, on the spot, into the profile.

In a further embodiment of the invention, the claw is designed as a sheet-like stamping, out of the plane of which at least one tongue projects.

The advantage of this measure is that, by virtue of a very simple manufacturing operation, in each case suitable claws can be provided, which can be produced cost-effectively as a simple mass manufacture part. The fitter then selects an appropriate claw and inserts this. The tongues are designed such that they are pressed down during driving in, that is to say during the assembly of the articulation part and arm profile, but at the same time already bite into the material, and then block a pulling off due to this positive engagement.

It should be appreciated that the features mentioned above and those yet to be explained below may be employed not only in the combinations specified in each case, but also in other combinations or alone, without departing from the scope of the present invention.

BRIEF DESCRIPTION OF THE DRAWINGS

The invention is described and explained in more detail below with reference to some selected exemplary embodiments, in conjunction with the accompanying drawings in which:

FIG. 6 shows a section along the line VI-VI in FIG. 3, the left half illustrating a section only through the arm profile before the articulation part is driven in and the right half illustrating a section after the arm profile has been driven in.

DETAILED DESCRIPTION OF PREFERRED EMBODIMENTS

Figure 1:
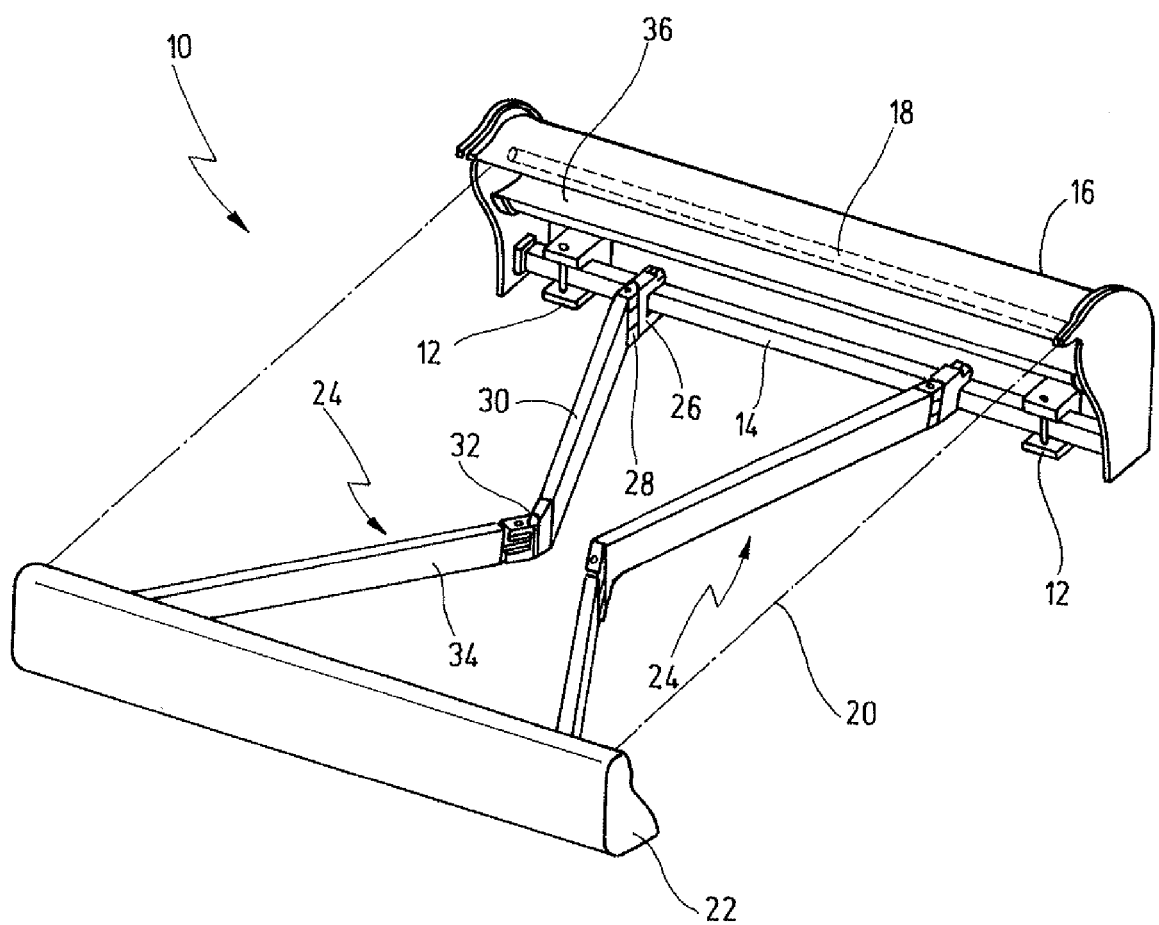
FIG. 1 shows a perspective view of an awning in the form of a collapsible-arm awning with articulated arms according to the invention in a state in which the cloth together with the drop rod is extended.

An awning illustrated in FIG. 1 is provided in its entirety with the reference numeral 10.

The awning 10 is fastened via two wall brackets 12, for example, to an outside wall of a building, not illustrated here. The wall brackets 12 carry a carrying tube 14, here of rectangular profile, which acts as a carrying component of the awning 10. The carrying tube 14 carries a sleeve 16 which receives the winding shaft 18 on which the cloth 20 is wound or from which it is unwound.

The outer end, what is known as the drop end, of the cloth 20 is connected to a drop rod 22. Two mirror-symmetrically designed collapsible arms 24 extend between the drop rod 22 and carrying tube 14. Each collapsible arm 24 is attached longitudinally displaceably to the carrying tube 14 via a carrying block 26. The carrying block 26 is connected to an articulation part 28 onto which an arm profile 30 is attached. At the opposite end, the arm profile 30 is connected to a joint 32 connected to a further arm profile 34, the outer end of which is again connected to the drop rod 22 via a corresponding articulation part, not evident here.

The arm profiles, designed as hollow profiles, receive here spring elements, not evident in any more detail, which act to stretch out the collapsible arms, that is to say to press the drop rod 22 away from the winding shaft 18, so that the cloth 20 is These considerable tensile forces also pull on the connection between the articulation part 28 and arm profile 30 and act in the direction of a release of this connection, which, of course, is to be ruled out in a simple way by virtue of the invention.

The cloth 20 is drawn off out of a slot 36 in the sleeve 16. The endeavor is to keep the drop rod 22 always aligned exactly parallel to this slot 36 of the sleeve 16. This is, on the one hand, for visual reasons, but also, when the cloth 20 is drawn in, to bring about a leaktight, neat closure of the slot 36.

If, for example, the connection between the articulation part 28 and arm profile 30 loosens or is not permanently stable, this results in unsightly misalignments between the drop rod 22 and sleeve 16, which, depending on the nature of the misalignment, on the width of the awning and on the drop length, may be more or less pronounced and may also occur in various directions.

Figure 2:
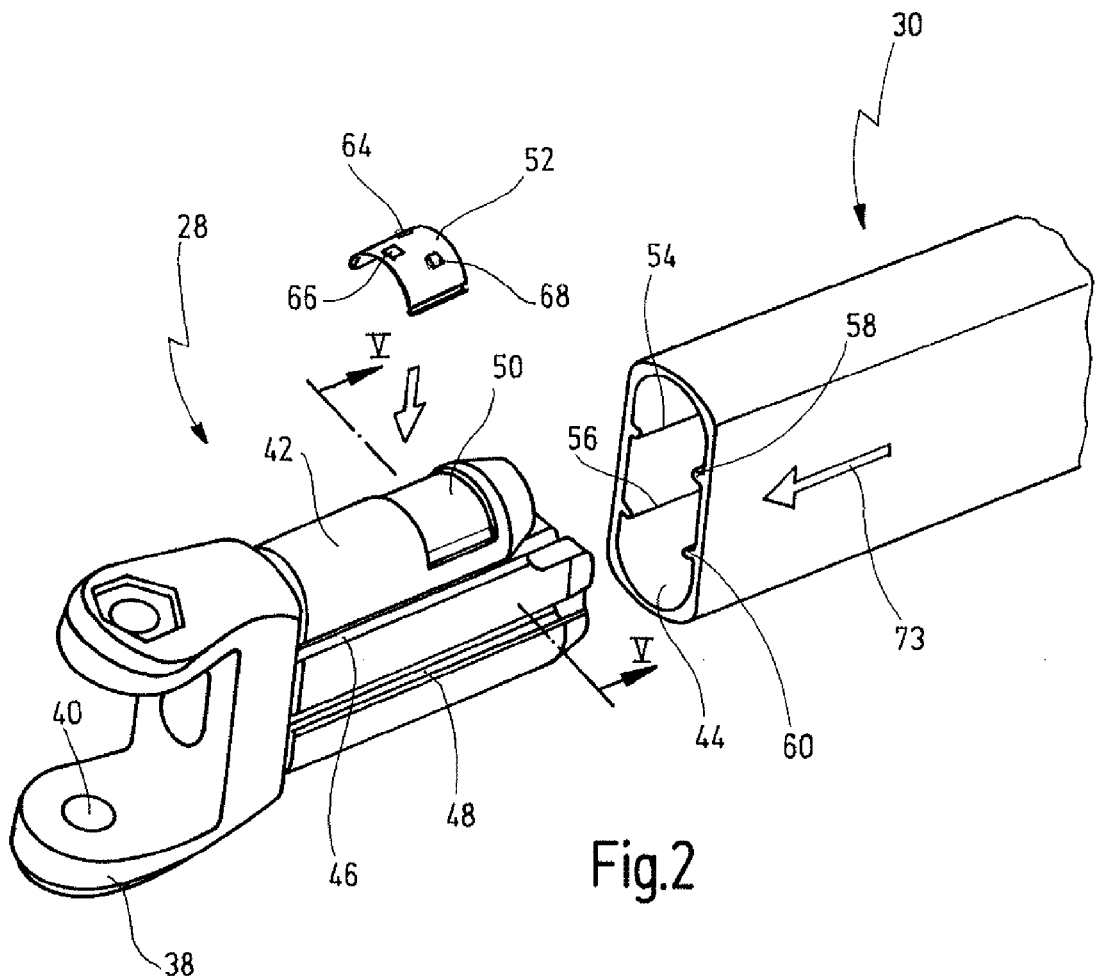
FIG. 2 shows a greatly enlarged perspective exploded view of an articulated arm of the awning of FIG. 1 before assembly, with an arm profile and with the claw lifted from the articulation part.

FIG. 2 illustrates the articulation part 28 and the arm profile 30 in a situation immediately before mounting. The configurations and mounting operations to be described in connection with the articulation part 28 also apply likewise to the further articulation parts of the joint 32 or to the articulation part for connection to the drop rod 22.

The articulation part 28 has at one end a fork 38 which has a continuous eye 40 in both prongs. This serves for fastening to the carrying block 26 and also constitutes the vertical pivot axis of the collapsible arm 24. A tenon 42 projects from the fork 28 and is designed such that it can be driven into an interior 44 of the arm profile 30. On the side facing the observer, the tenon 42 has two grooves 46 and 48 which run in the insertion direction 73 or in the longitudinal direction of the arm profile 30 and which converge somewhat in the insertion direction 73, that is to say as seen, looking toward the fork 38, specifically at an angle of approximately 1 to 2 degrees. and which converge somewhat in the insertion direction 73, that is to say as seen, looking toward the fork 38, specifically at an angle of approximately 1 to 2 degrees.

On the top side, evident in FIG. 2, of the tenon 42, a recess 50 is provided, into which a claw 52 can be inserted or snapped, as described in more detail below.

The arm profile 30 is designed as an elongate hollow continuous casting profile, from the inside of which four webs 54, 56, 58, 60 project. These webs 54-60 extend over the entire longitudinal extent of the arm profile 30 and are formed during the continuous casting operation.

The arm profile 30 has an approximately oval cross section, and the position and configuration of the webs 58 and 60 are such that these can move into the grooves 46 and 48 on the tenon 42 of the articulation part 28.

As is described in more detail below in connection with FIG. 6, the grooves 46 and 48 are designed such that the arm profile 30 or its webs 58 and 60 can first be applied with lateral play in the grooves 46 and 48, and therefore the arm profile 30 can be pushed onto the tenon 42, virtually without resistance, over a certain distance.

The configuration of the claw 52 will be described in more detail first in connection with FIGS. 4 and 5.

Figure 4:
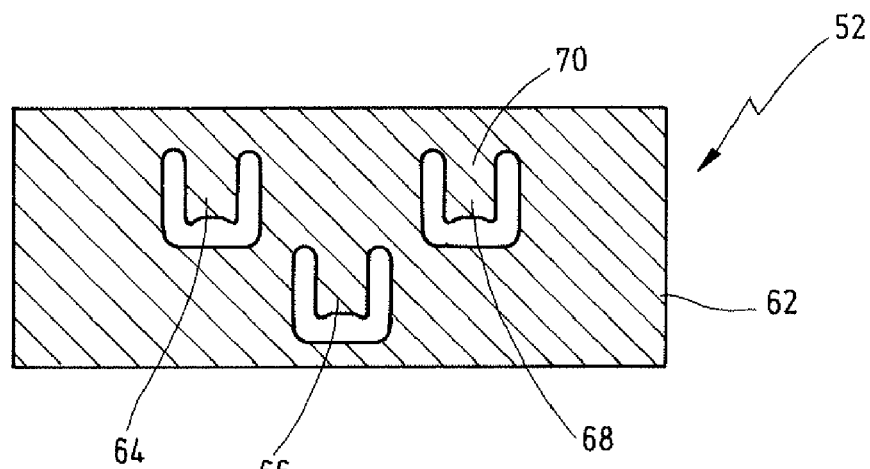
FIG. 4 shows a top view of the claw as a not yet bent stamping.

It is evident from FIG. 4 that the claw 52 is designed as a rectangular stamping 62, out of which three tongues 64, 66 and 68 are stamped.

The stamping 62 consists of a spring steel alloy.

Figure 5:
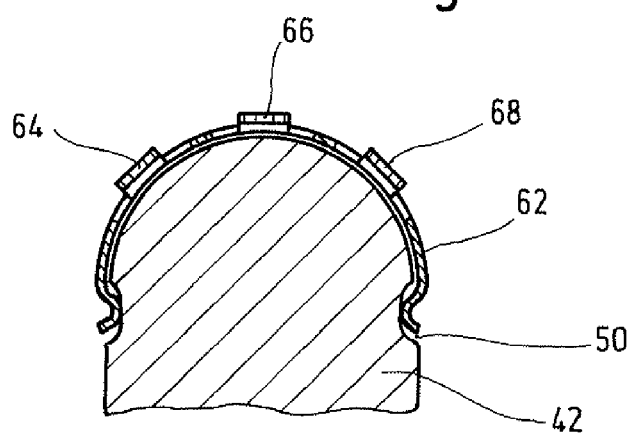
FIG. 5 shows a section along the line V-V of FIG. 2 with a claw put in place.

The stamping 62 is brought out of the planar orientation illustrated in FIG. 4 into the bent orientation evident in FIG. 2 or in FIG. 5, the three tongues 64, 66 and 68 being bent out of the plane of the stamping 62.

The stamping 62 thus bent is inserted or snapped on into the recess 50, specifically in such a way that the root 70 of each tongue 64, 66, 68 faces the arm profile 30 and the corresponding bent-up tip of each tongue faces the fork 38 of the articulation part 28.

When the tenon 42 is driven into the interior 44 of the arm profile 40, the tongues 64, 66, 68 or their tips are pressed downward somewhat correspondingly to the manufacturing tolerances, but already bite into the material on the inside of the arm profile 30.

Figure 3:
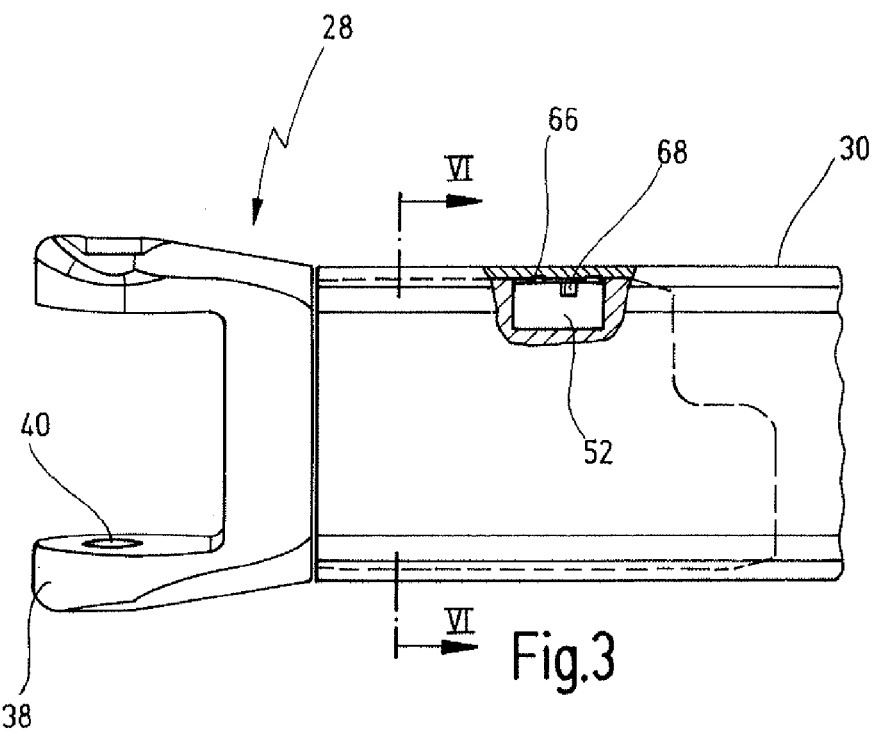
FIG. 3 shows a partially cut away side view of the parts of FIG. 2 after assembly.

This situation is illustrated in the section of FIG. 3. Positive intermeshing or clawing between the tongues 64, 66, 68 and the material of the arm profile 30 is thereby formed, which is designed such that pulling off opposite to the insertion direction 73 is blocked. Such a pulling-off movement would, of course, cause an erection and further biting of the tongues 64, 66, 68 into the material of the arm profile 34, that is to say an even firmer clawing of the two components, namely the articulation part 28 and the arm profile 34, together. This clawing or this positive engagement is also maintained permanently and even under alternating tensile and compressive loads and also withstands thermal deformations or loads, this being implemented, in particular, by the elasticity of the bent-out tongues 64-68. Tests showed that it is possible for the arm profile 30 to be pulled off from the articulation part 28 only by means of high forces such as do not occur when an awning is in operation, and, even then, only with the materials being partially destroyed. Long-term tests with alternating tensile and pushing loads showed that, by virtue of the elasticity of the tongues, a fit permanently protected against pulling off is ensured.

Mounting itself can be carried out in a simple way, the fitter simply snapping the claw 52 onto the recess 50, as illustrated by an arrow in FIG. 2, and the articulation part 28 subsequently being driven into the arm profile 30 cut to length according to local conditions.

Figure 6:
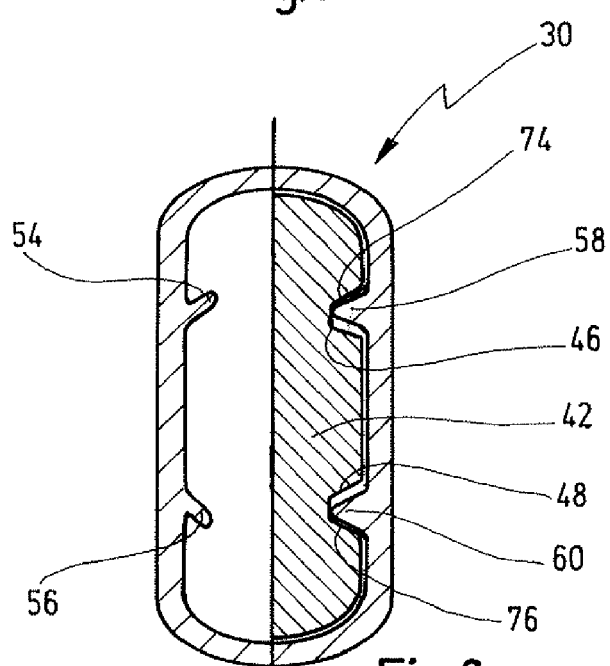

It is evident from the sectional illustration of FIG. 6 that the webs 54, 56 are integrally formed such that they are bent somewhat toward the narrower profile side.

The profile of the grooves 46 and 48 on the outside of the tenon 42 is such, then, that the webs 58 and 60 can first be introduced with transverse play into tie grooves 46, 48. The upper flank 74 of the groove 46, as illustrated in FIG. 6, then comes into contact with the upwardly bent web 58 and bends the latter downward somewhat during further driving in. In other words, the flank 74 of the groove 46 and the corresponding opposite flank of the web 58 form clearly defined engagement surfaces which serve for exact guidance during deformation. This engagement becomes gradually stronger due to a convergence of the grooves 46 and 48 in the direction of the fork 38. The convergence angle is approximately 1 to 2 degrees.

The same applies accordingly to the flank 76 of the lower groove 48 of the tenon 42, which flank comes into engagement correspondingly with the flank of the lower web 60 and bends the latter upward somewhat. An exactly defined press fit of specific extent, that is to say of specific area dimension and force dimension, is thereby formed.

Figure 7:
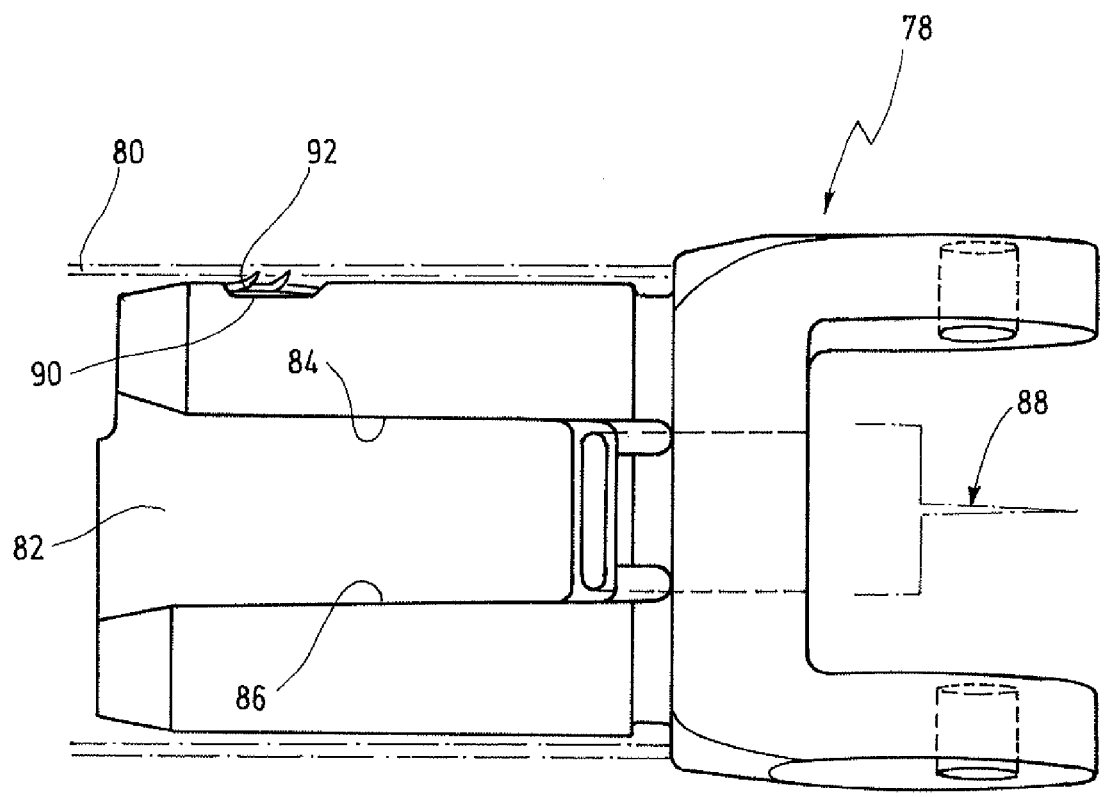
FIG. 7 shows a side view of a articulation part of a further embodiment, a pushed-on arm profile being indicated.
Figure 8:
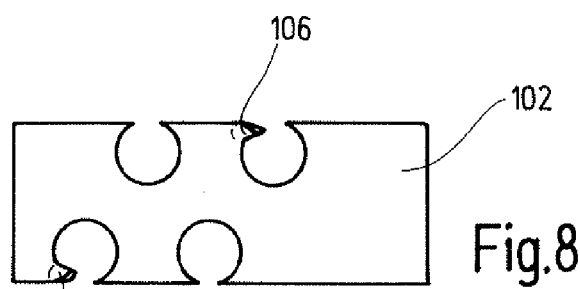
FIG. 8 shows an illustration, comparable to the illustration of FIG. 4, of a further exemplary embodiment of a claw in the form of a stamping.
Figure 9:
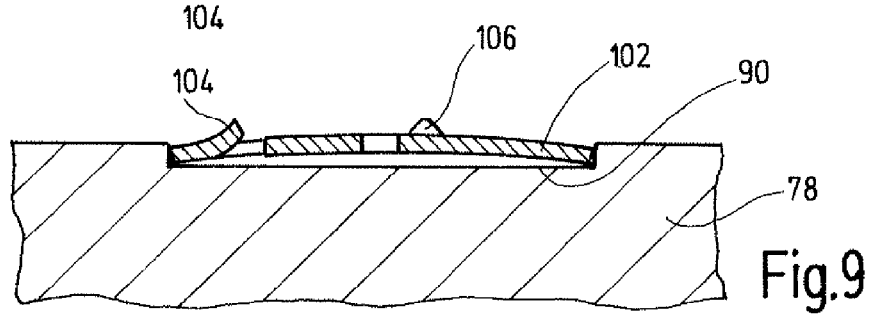
FIG. 9 shows a greatly enlarged illustration of a section in the region of the inserted claw of FIG. 7.

FIGS. 7 to 9 illustrate a further embodiment of an articulation part 78 which is constructed basically identically to the articulation part 28.

The articulation part 78 receives in its tenon a clearance 82, the opposite flanks 84 and 86 of which run convergently in the direction of the fork at a small angle 88, here too, for example, at an angle of 1.5 degrees.

The action of these two flanks 84 and 86 corresponds to the above-described action of the flanks 74 and 76 of the grooves 46 and 48.

In other words, the above-described arm profile 30 of the same configuration can also be pushed onto the articulation part 78.

In this embodiment, due to the clearance 82 there is sufficient space available in order, for example, to receive in and lead through the articulation part 78 ropes or chains of the tensioning device accommodated in the arm profiles.

It is also possible to configure the articulation part 28 on one side such as is evident from FIG. 2 and to configure it on the opposite side such as is evident in FIG. 7.

As is evident particularly from FIGS. 8 and 9, here, the claw 92 is likewise designed as a stamping 102, out of which, for example, two tongues 104 and 106 are bent up here.

The stamping 102 is not deformed, like the stamping 62 described above, but, instead, is inserted into a recess 90 on an upper longitudinal edge of the articulation part 78, in which case, as is evident in FIG. 9, said stamping is in this case arched somewhat, that is to say inserted under tension, and therefore held captive in the recess 90. Here, too, the tongues 104 and 106 are then oriented again such that it is possible for an arm profile 80, as is indicated in FIG. 7, to be pushed onto the articulation part 78, and for the tongues 104 and 106 in this case to bite and claw into the material and prevent pulling off.

What is claimed is:

1. An articulated awning arm, comprising
an articulation part;
an arm profile;
wherein
said articulation part and said arm profile are inserted one into another with a press fit, said articulation part has a tenon which can be inserted into said arm profile, which tenon has an engage surface engaging with said arm profile, a clearance is present in said tenon, said clearance having flanks, said flanks come into engagement as an engagement surface with deformable elements on said arm profile, and said flanks of said clearance run in an insertion direction and have an inclination with respect to said insertion direction; and a pull-off protection having at least one claw disposed between said articulation part and said arm profile, said claw being designed as a separate component.

2. The articulated arm of claim 1, wherein engagement surfaces are provided on said articulation part and on said arm profile, which engagement surfaces come to lie one against the other with a press fit in a defined manner during inserting said articulation part and said arm profile one into another.

3. The articulated arm of claim 2, wherein at least one engagement surface lies against an element which is deformable during inserting said articulation part and said arm profile one into another.

4. The articulated arm of claim 3, wherein said arm profile is designed as a hollow profile, said deformable element projects from an inside of said hollow profile.

5. The articulated arm of claim 4, wherein said deformable element is designed as longitudinal webs projecting from said inside of said hollow profile.

6. The articulated arm of claim 5, wherein at least one flank of said longitudinal web is designed as one of said engagement surfaces.

7. The articulated arm of claim 1, wherein at least one groove is present in that tenon, a flank of said groove comes into engagement as an engagement surface with at least one deformable element on said arm profile.

8. The articulated arm of claim 7, wherein said tenon has engagement surfaces running in an insertion direction and having an inclination with respect to said insertion direction.

9. The articulated arm of claim 8, wherein said tenon has two grooves which converge in said insertion direction.

10. The articulated arm of claim 1, wherein said claw can be attached to said articulation part.

11. The articulated arm of claim 10, wherein said claw can be introduced with a firm fit into a recess on said articulation part.

12. The articulated arm of claim 1, wherein said claw is designed as sheet-like stamping, out of a plane of which at least one tongue projects.

13. The articulated arm of claim 12, wherein said sheet-like stamping of said claw includes a spring steel alloy.

14. The articulated arm of claim 12, wherein said claw includes a curved shape.

15. The articulated arm of claim 1, wherein said claw includes at least one U-shaped cut-out to define a raised tongue.

* * * * *